United States Patent [19]
Mercer, II

[11] 4,422,509
[45] Dec. 27, 1983

[54] PROSTHETIC HORSESHOE

[76] Inventor: Roger W. Mercer, II, 623 W. Church Rd., Sterling, Va. 22170

[21] Appl. No.: 375,960

[22] Filed: May 7, 1982

[51] Int. Cl.³ .......................... A01L 1/00; A01L 7/00
[52] U.S. Cl. .......................................... 168/4; 168/11
[58] Field of Search ................. 168/4, 11, 17, 23, 26, 168/41, 42

[56] References Cited
U.S. PATENT DOCUMENTS

| | | | |
|---|---|---|---|
| 329,193 | 10/1885 | Meredith | 168/26 |
| 872,214 | 11/1907 | Bethune | 168/11 |
| 898,895 | 9/1908 | Hovis | 168/26 |
| 1,349,888 | 8/1920 | Kenny | 168/14 |

FOREIGN PATENT DOCUMENTS 79728 2/1895 Fed. Rep. of Germany ........ 168/17

Primary Examiner—Robert P. Swiatek
Attorney, Agent, or Firm—Louis E. Hay

[57] ABSTRACT

A prosthetic horseshoe for use in the treatment of the affliction known as chronic laminitis in which the coffin bone in a horse's foot rotates from its normal position. The prosthetic horseshoe has an adjustable pin designed to rotate the coffin bone back to its normal position and hold it there during treatment of the affliction.

3 Claims, 10 Drawing Figures

NORMAL

LAMINITUS

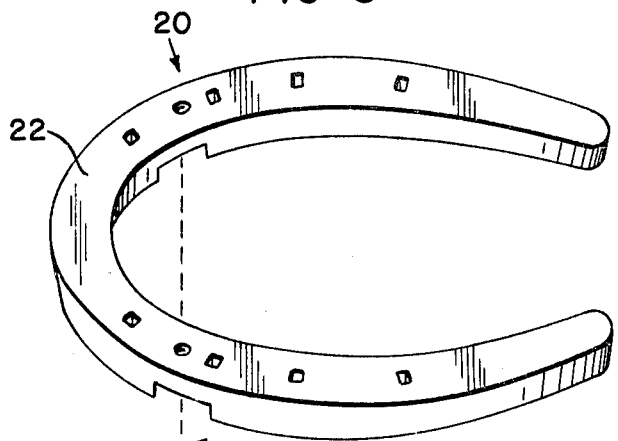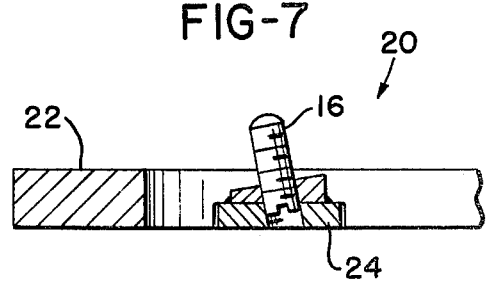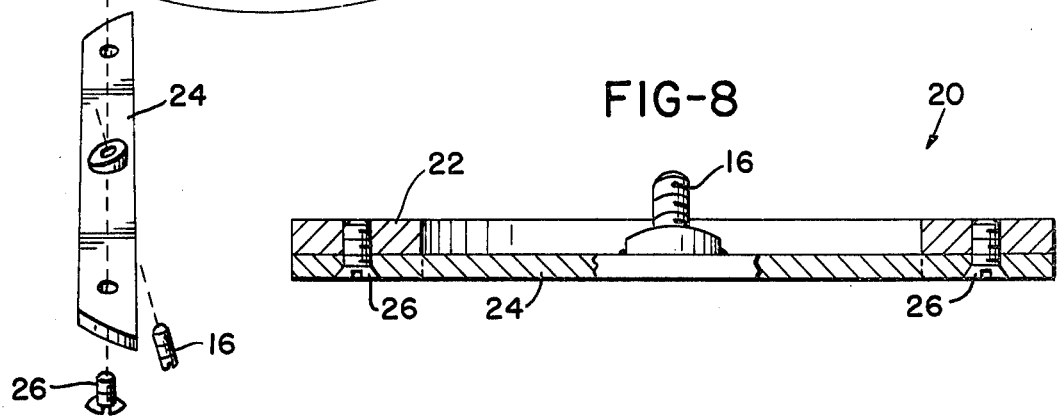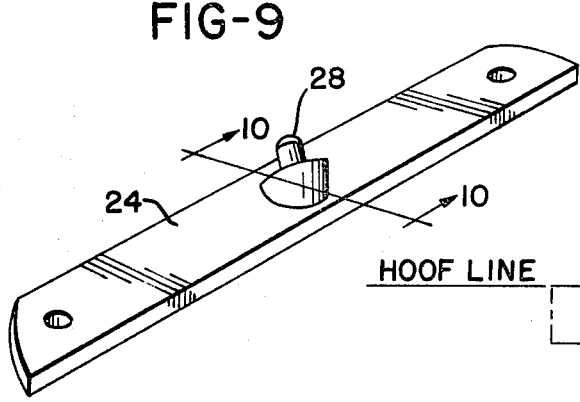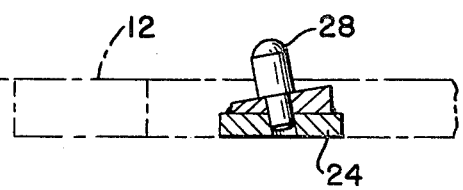

PROSTHETIC HORSESHOE

REFERENCE TO RELATED U.S. PATENTS

U.S. Pat. No. 507,525 Horsehoe—Burr—issued Oct. 31, 1893.

U.S. Pat. No. 1,070,507 Horseshoe—Mercandelli—issued Aug. 19, 1913.

BACKGROUND OF THE INVENTION

Laminitis, or founder as it is commonly known, is an inflammation of the sensitive laminae in the feet of horses, more commonly occurring in the front feet. It is an extremely painful and disabling affliction sometimes rendering the horse useless in breeding or riding activities.

The causes of the affliction are varied, one of the more common causes being overfeeding of grain which has an adverse effect on the blood chemistry of the animal and results in inflammation of the laminae.

An excellent treatise of the affliction may be found in the Special Report on Diseases of the Horse, which was published in 1903 by the U.S. Department of Agriculture. Another excellent publication is titled Lameness in Horses by O. R. Adams, D.V.M., M.S. and published by Lea & Febiger, Philadelphia.

In the advanced stage, known as chronic laminitis, the inflammation in the sensitive laminae is so severe that the sensitive and horny laminae separate. This leaves the coffin bone no support within the hoof, so the horse's weight pushing down on the anterior (front) portion of the hoof causes the coffin bone to rotate downward. In some cases the rotation is so severe that the end of the bone pierces the bottom of the foot which necessitates destruction of the animal.

SUMMARY OF THE INVENTION

The primary objective of the present invention is to provide a prosthetic horseshoe which will assist in the treatment of the affliction by providing a means for mechanically rotating and maintaining the out of position coffin bone into normal position in the foot. Because of the inflammation and congestion in the foot which causes a separation between horny and sensitive laminae, allowing the bone to rotate out of position, rotating the bone back to normal position must be accomplished in stages over a period of time during which medical and dietary treatment is practiced to reduce the inflammation and congestion.

The prosthetic horseshoe constituting the present invention uses a properly located cross bar joined to the two sides of the horseshoe; the cross bar providing a platform for supporting a screw, for example, which may be adjusted from time to time in order to apply a biasing pressure for rotating and maintaining the coffin bone in the direction of its normal position in the foot. In order for the screw to apply pressure against the bone, the screw must enter the foot through an incision in the bottom of the foot. This incision itself must be periodically sterilized and treated.

BRIEF DESCRIPTION OF THE DRAWINGS

FIG. 6 is an exploded plan view of a second embodiment of the invention;

FIG. 7 is a sectional elevation comparable to FIG. 4 and showing a screw means for rotating the coffin bone;

FIG. 8 is a lateral section through the assembled components of FIG. 6 looking toward the front of the shoe;

FIG. 9 is a schematic of the bar depicted in FIG. 6 and showing a shouldered pin in substitution of the screw; and, FIG. 10 is a vertical section taken along the line 10—10 of FIG. 9.

DESCRIPTION OF THE PREFERRED EMBODIMENTS

Figure 1:
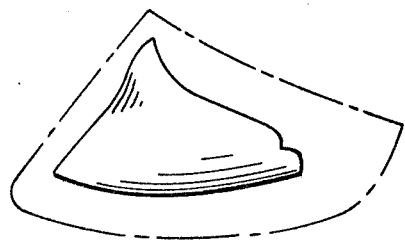
FIG. 1 is a schematic of the hoof portion of a horse's front foot showing the coffin bone in its normal position.
Figure 2:
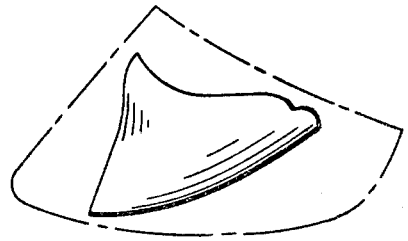
FIG. 2 is a schematic comparable to FIG. 1 and showing the coffin bone rotated to an abnormal position.
Figure 3:
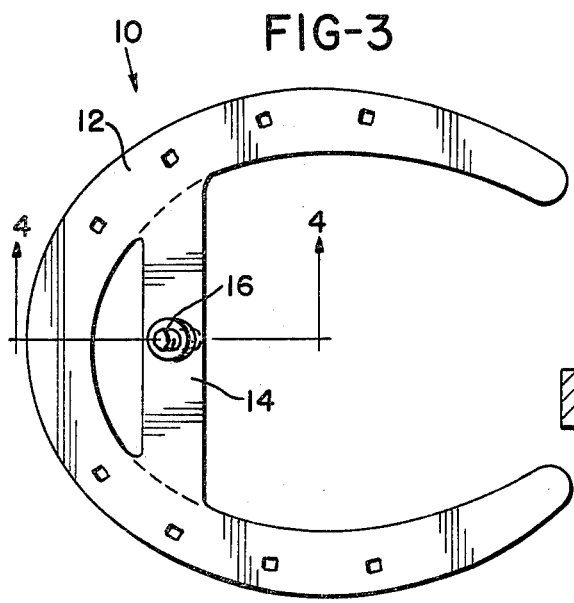
FIG. 3 is a plan view of a first embodiment of the prosthetic horseshoe.
Figure 4:
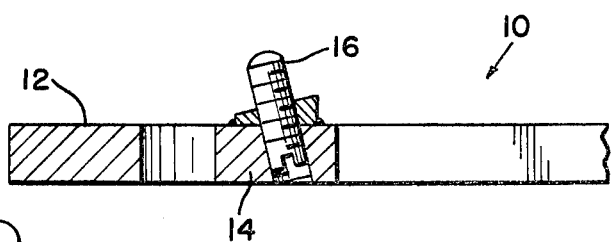
FIG. 4 is a sectional elevation taken on the line 4—4 of FIG. 3 and showing a screw means for rotating the coffin bone.
Figure 5:
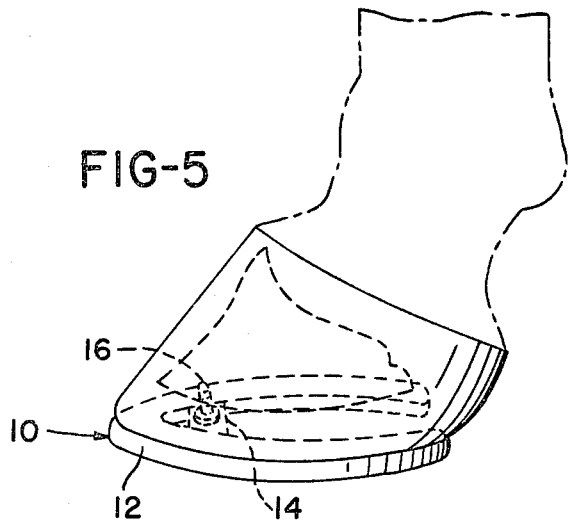
FIG. 5 is a schematic showing the prosthetic horseshoe attached to the front foot of a horse with the coffin bone rotated to normal position.

FIG. 1 schematically depicts a coffin bone in normal position relative to the front foot of a horse. FIG. 2 schematically depicts the same coffin bone rotated to an abnormal position due to the affliction known as laminitis. FIG. 5 schematically depicts the coffin bone rotated back to its normal position by use of the prosthetic horseshoe depicted in FIGS. 3 and 4.

The prosthetic horseshoe 10 may be made from a conventional horseshoe 12 which may be nailed to the roof of a horse. A lateral bar 14 may be welded in the proper longitudinal location on a conventional shoe, or, the bar may be forged integrally with the shoe. As most clearly depicted in FIG. 4, a biasing support screw 16 is supported by the lateral bar 14. The end of the screw contacting the coffin bone should be spherical as depicted. The specific location of the lateral bar 14 and the angle of the screw 16 in relationship with the bar should be determined by the veterinarian.

A second embodiment of the prosthetic horseshoe is depicted in FIGS. 6-10. One of the principal advantages of the second embodiment is that the lateral bar may be removed from the shoe, which makes it easier to clean and sterilize the laceration in the foot of the horse. Another advantage is that the angle of the biasing pin may be changed by substitution of bars, each of which is made with a different angle.

The prosthetic horseshoe 20 may be made from a conventional horseshoe 22 which may be nailed to the roof of a horse. The bottom face of the shoe 22 is milled with slots to receive the lateral bar 24 which is held in place on the shoe by means of screws 26. As most clearly depicted in FIG. 7, a biasing support screw 16 is supported by the lateral bar 24.

As depicted in FIGS. 9 and 10, a shouldered pin 28 may be used in lieu of the screw 16. A plurality of pins 28 may be provided, each pin having a different protruding length. The protruding length of the pin may also be increased by use of flat washers as spacers between the pin and the bar. The small diameter of the pin may be made to have a free fit in the aperture through the bar 24. The amount of rotation applied to the coffin bone is established by the protruding length of the pin.

Both the screw 16 and the pins 28 should be made of stainless steel or other materials which are not corrosive in the body fluids secreting from the lacerations. Another advantage of the pins is that there are no screw threads which can become gummed by the secreting body fluids.

It is to be understood that the embodiments of the present invention as shown and described are to be regarded merely as illustrative, and that the invention is susceptible to variations, modifications and changes, without regard to specific construction methods, within the scope of the appended claims.

I claim:

1. For use in the treatment of a horse having laminitis, a prosthetic horseshoe comprising:
   (a) a horseshoe having the general shape of a hoof and adapted for fastening to a hoof of said horse, said horseshoe having a lateral bar, the ends of which are integral with the sides of said horseshoe; and,
   (b) biasing means supported by the lateral bar of said horseshoe and adapted for rotating the out of position coffin bone to its normal position in the foot of said horse, said biasing means being an upwardly protruding screw adjustably supported by the lateral bar of said horseshoe, the longitudinal axis of said screw being at an angle less than 90 degrees with the upper face on said horseshoe.

2. For use in the treatment of a horse having laminitis, a prosthetic horseshoe comprising:
   (a) a horseshoe having the general shape of a hoof and adapted for fastening to a hoof of said horse, said horseshoe having a lateral bar, the ends of which are detachably joined to the sides of said horseshoe; and,
   (b) biasing means supported by the lateral bar on said horseshoe and adapted for rotating the out of position coffin bone to its normal position in the foot of said horse, said biasing means being an upwardly protruding screw adjustably supported by the lateral bar of said horseshoe, the longitudinal axis of said screw being at an angle less than 90 degrees with the upper surface of said horseshoe.

3. For use in the treatment of a horse having laminitis, a prosthetic horseshoe comprising:
   (a) a horseshoe having the general shape of a hoof and adapted for fastening to a hoof of said horses, said horseshoe having a lateral bar, the ends of which are detachably joined to the sides of said horseshoe; and,
   (b) biasing means supported by the lateral bar on said horseshoe and adapted for rotating the out of position coffin bone to its normal position in the foot of said horse, said biasing means being an upwardly protruding shoulder pin supported by the lateral bar of said horseshoe, the longitudinal axis of said shoulder pin being at an angle less than 90 degrees with the upper surface of said horseshoe.

* * * * *